US009491413B2

United States Patent
Matsumoto et al.

(10) Patent No.: US 9,491,413 B2
(45) Date of Patent: Nov. 8, 2016

(54) IMAGING APPARATUS AND IMAGE TRANSMITTING METHOD

(71) Applicant: Sony Corporation, Tokyo (JP)

(72) Inventors: Hideyuki Matsumoto, Tokyo (JP); Tamotsu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 13/765,963

(22) Filed: Feb. 13, 2013

(65) Prior Publication Data

US 2013/0235194 A1   Sep. 12, 2013

(30) Foreign Application Priority Data

Mar. 6, 2012   (JP) ................ 2012-049085

(51) Int. Cl.
| | |
|---|---|
| *H04N 7/18* | (2006.01) |
| *H04N 5/232* | (2006.01) |
| *H04N 19/172* | (2014.01) |
| *H04N 19/61* | (2014.01) |
| *H04N 19/114* | (2014.01) |
| *H04N 19/164* | (2014.01) |
| *H04N 19/177* | (2014.01) |

(52) U.S. Cl.
CPC .............. *H04N 7/183* (2013.01); *H04N 5/232* (2013.01); *H04N 19/114* (2014.11); *H04N 19/164* (2014.11); *H04N 19/172* (2014.11); *H04N 19/177* (2014.11); *H04N 19/61* (2014.11)

(58) Field of Classification Search
CPC ...... H04N 7/18; H04N 7/183; H04N 19/176; H04N 19/61; H04N 19/105; H04N 19/46; H04N 19/117; H04N 21/234309; H04N 21/2365; H04N 21/2402; H04N 5/23245; H04N 19/00145; H04N 19/00169; H04N 19/00721
USPC ........ 348/143, 159, 419, 405, 400, 414, 406
IPC ....................................................... H04N 7/18
See application file for complete search history.

(56) References Cited

U.S. PATENT DOCUMENTS

| | | | | |
|---|---|---|---|---|
| 6,122,400 | A * | 9/2000 | Reitmeier ............. | G06T 7/2026 348/E5.003 |
| 6,356,945 | B1 * | 3/2002 | Shaw .................... | G06F 9/4887 348/E5.003 |
| 6,785,338 | B1 * | 8/2004 | Reitmeier et al. ........ | 375/240.29 |
| 8,275,004 | B2 * | 9/2012 | Song et al. .................... | 370/535 |
| 2005/0275721 | A1* | 12/2005 | Ishii .............................. | 348/159 |
| 2008/0263605 | A1* | 10/2008 | Mine .................. | H04N 7/17318 725/87 |
| 2012/0124455 | A1 | 5/2012 | Koshisaka et al. | |
| 2012/0131412 | A1 | 5/2012 | Shinbashi et al. | |
| 2012/0131422 | A1 | 5/2012 | Shinbashi et al. | |

* cited by examiner

*Primary Examiner* — Trang U Tran
(74) *Attorney, Agent, or Firm* — Chip Law Group

(57) ABSTRACT

Disclosed herein is an imaging apparatus including: an imaging portion capturing an image of a subject, thereby acquiring a video signal; a first coding portion compression-coding the video signal through intra-frame compression and inter-frame compression, thereby generating a first coded signal; a second coding portion compression-coding the video signal through the intra-frame compression, thereby generating a second coded signal an amount of information on which is less than that of the first coded signal; and a signal sending portion sending the first coded signal and the second coded signal to a coaxial cable.

8 Claims, 7 Drawing Sheets

F I G . 1
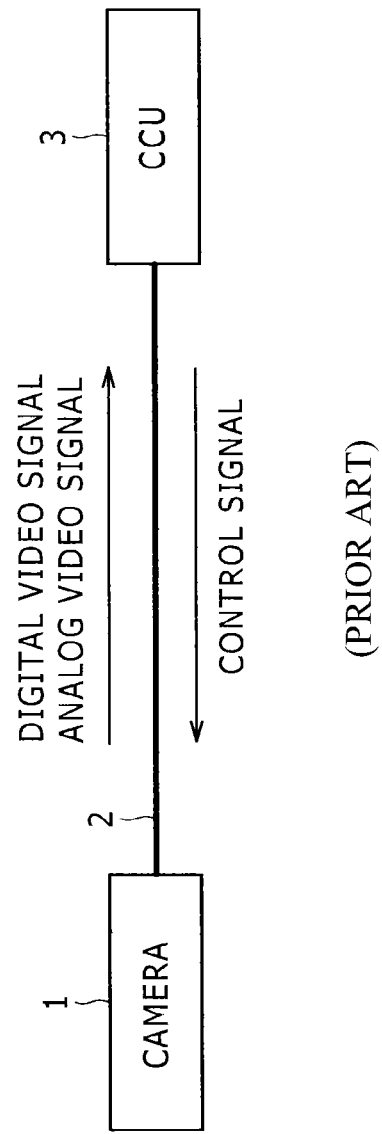
(PRIOR ART)

(PRIOR ART)

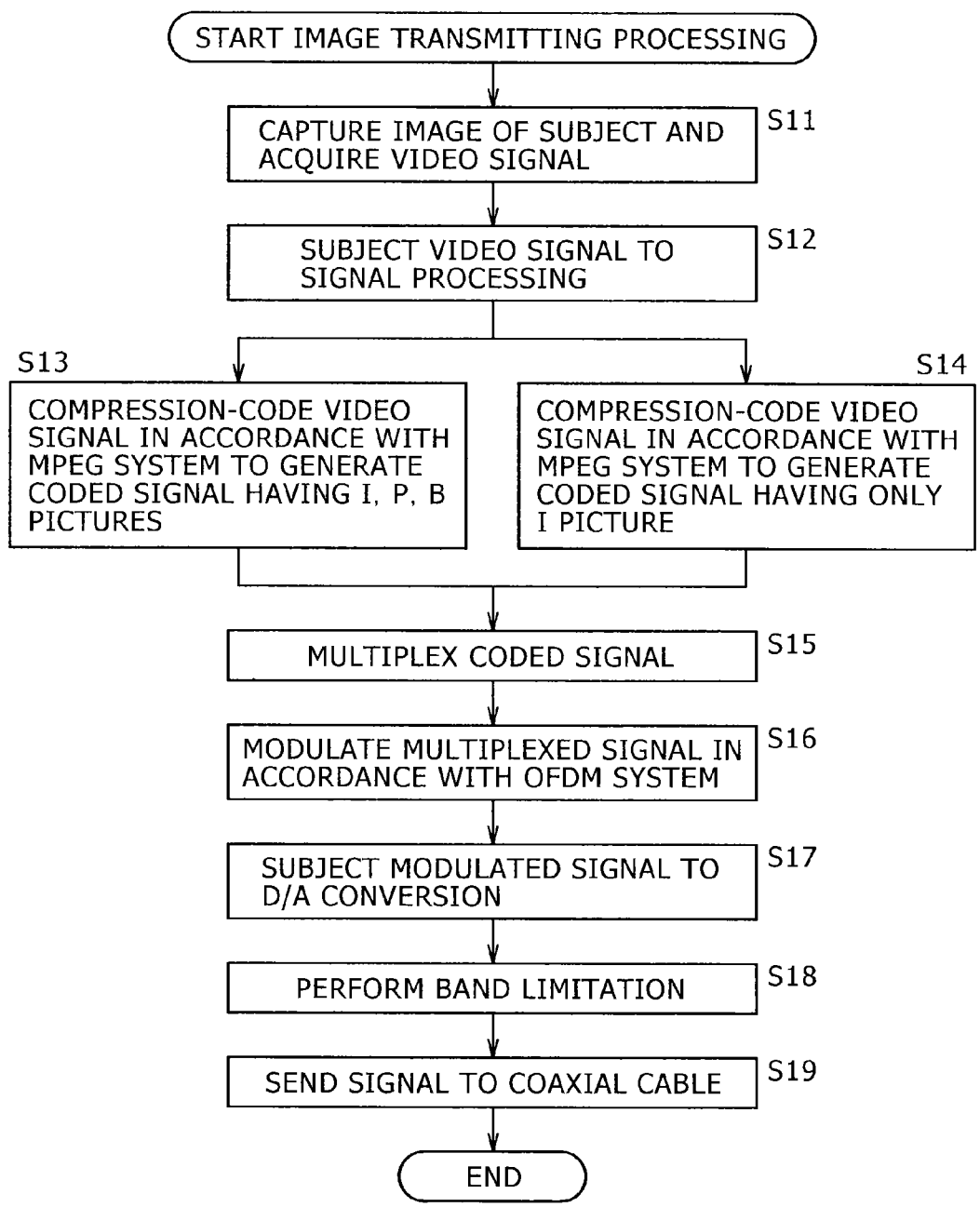

IMAGING APPARATUS AND IMAGE TRANSMITTING METHOD

BACKGROUND

The present disclosure relates to an imaging apparatus and an image transmitting method used in the same, and more particularly to an imaging apparatus for which a cost of parts or components can be reduced, and an image transmitting method used in the same.

Heretofore, analog transmission in which a video signal obtained from a monitoring camera is transmitted as an analog signal to a Camera Control Unit (hereinafter referred to as "a CCU") through a coaxial cable has been a mainstream in a monitoring camera system. The popularization of the analog transmission is wide and thus in a facility to which a monitoring camera system is introduced, cables are laid so as to penetrate in every hole and corner of the facility.

Although in recent years, there has been desired the increasing in the image quality of an image due to the digitization, a great cost is required for replacement of the cables which are laid so as to penetrate in every hole and corner of the facility.

In an image transmitting system used to transmit a video signal through a coaxial cable, there are proposed a technique adapted to transmit a digital signal, and a technique adapted to transmit a digital signal together with an analog signal. These techniques, for example, are described in Japanese Patent Laid-Open No. 2010-251979 and PCT Patent Publication No. WO 2010/88625.

FIG. 1 shows an example of a configuration of an image transmitting system used to transmit both of an analog signal and a digital signal through a coaxial cable.

In the image transmitting system shown in FIG. 1, a camera 1 generates both of a digital video signal and an analog video signal as a video signal of a captured moving image, and transmits both of the digital video signal and the analog video signal to a CCU 3 through a coaxial cable 2. The CCU 3 transmits a control signal in accordance with which the camera 1 is controlled to the camera 1 through the coaxial cable 2. It is noted that the video signal which has been transmitted to the CCU 3 is supplied to a recording apparatus or a reproducing apparatus (both not shown) and is then recorded or reproduced (displayed).

In the system used to carry out the existing analog transmission, a frequency band of an analog signal to be transmitted is in the range of about 0 Hz (DC (Direct Current)) to 10 MHz, and thus a frequency band above 10 MHz is not used at all. Then, in the image transmitting system shown in FIG. 1, as shown in FIG. 2, a band (in the range of about 10 MHz to 100 MHz) above the frequency band with which the analog video signal is transmitted is also utilized, whereby it is realized to transmit both of the digital video signal and the control signal in addition to the analog video signal.

FIG. 3 is a block diagram showing an example of a concrete configuration of the camera 1 shown in FIG. 1.

In the camera 1 shown in FIG. 3, a signal processing portion 22 subjects a video signal acquired from an imaging portion 21 to predetermined processing, and supplies the resulting video signal to each of a coding portion 23 and a CVBS conversion portion 27.

The coding portion 23 compression-codes the video signal supplied thereto from the signal processing portion 22 in accordance with a Moving Picture Experts Group (MPEG) system and supplies the coded signal to a modulating portion 24. The modulating portion 24 modulates the coded signal supplied thereto from the coding portion 23 in accordance with an Orthogonal Frequency Division Multiplexing (OFDM) system, and supplies the modulated signal to a D/A conversion portion 25. The D/A conversion portion 25 subjects the modulated signal obtained through the modulation in the modulating portion 24 to Digital to Analog (D/A) conversion and supplies the resulting signal to a filter processing portion 26. The filter processing portion 26 extracts only a component in a predetermined frequency band from the signal supplied thereto from the D/A conversion portion 25, thereby carrying out band limitation, and supplies the resulting signal to an adder 30.

The CVBS conversion portion 27 converts the video signal supplied thereto from the signal processing portion 22 into a digital composite video signal (Composite Video, Blanking, and Sync (CVBS) signal) in accordance with D2-VTR (D2-Videotape Recorder), and supplies the CVBS signal to a D/A conversion portion 28. The D/A conversion portion 28 subjects the CVBS signal obtained through the conversion in the CVBS conversion portion 27 to D/A conversion, and supplies the resulting signal to a filter processing portion 29. The filter processing portion 29 extracts only a component in a predetermined frequency band from the signal supplied thereto from the D/A conversion portion 28, thereby carrying out band limitation, and supplies the resulting signal to the adder 30.

The adder 30 adds the signal (digital video signal) supplied thereto from the filter processing portion 26, and the signal (analog video signal) supplied thereto from the filter processing portion 29 to each other, and a signal sending portion 31 sends the signal obtained through the addition in the adder 30 to the coaxial cable 2.

It is noted that in the camera 1 shown in FIG. 3, a configuration adapted to receive the control signal supplied from the CCU 3 is omitted here in illustration and description thereof for the sake of simplicity.

With such a configuration, the camera 1 can transmit both of the analog video signal and the digital video signal to the CCU 3 through the coaxial cable 2.

In the CCU 3, the analog video signal supplied from the camera 1 shown in FIG. 3 is either recorded or reproduced with a lower delay than that in the digital video signal. The digital video signal is either recorded or reproduced at a higher image quality than that in the analog video signal. That is to say, by applying the image transmitting system shown in FIG. 1 to the monitoring camera system, when a watcher chases a suspicious individual, the watcher can control a monitoring camera while he/she visually checks the small-delay analog image, and also can record the high-quality digital image.

SUMMARY

However, in the case of the configuration of the camera 1 shown in FIG. 3, since there is required a large number of analog parts or components such as crystal oscillators provided in the coding portion 23 and the CVBS conversion portion 27, respectively, D/A convertors as the D/A conversion portions 25 and 28, band-pass filters as the filter processing portions 26 and 29, and the adder 30, it is difficult to reduce the cost of the parts or components.

The present disclosure has been made in view of the problem described above, and it is therefore desirable to provide an imaging apparatus for which a cost of parts or components can be reduced, and an image transmitting method used in the same.

According to an embodiment of the present disclosure, there is provided an imaging apparatus including: an imaging portion capturing an image of a subject, thereby acquiring a video signal; a first coding portion compression-coding the video signal through intra-frame compression and inter-frame compression, thereby generating a first coded signal; a second coding portion compression-coding the video signal through the intra-frame compression, thereby generating a second coded signal an amount of information on which is less than that of the first coded signal; and a signal sending portion sending the first coded signal and the second coded signal to a coaxial cable.

According to another embodiment of the present disclosure, there is provided an image transmitting method used in an imaging apparatus having: an imaging portion capturing an image of a subject, thereby acquiring a video signal; a first coding portion compression-coding the video signal through intra-frame compression and inter-frame compression, thereby generating a first coded signal; a second coding portion compression-coding the video signal through the intra-frame compression, thereby generating a second coded signal an amount of information on which is less than that of the first coded signal; and a signal sending portion sending the first coded signal and the second coded signal to a coaxial cable. The image transmitting method, executed by the imaging apparatus, includes: capturing the image of the subject, thereby acquiring the video signal; compression-coding the video signal through the intra-frame compression and inter-frame compression, thereby generating the first coded signal; compression-coding the video signal through the intra-frame compression, thereby generating the second coded signal the amount of information on which is less than that of the first coded signal; and sending the first coded signal and the second coded signal to the coaxial cable.

In the embodiments of the present disclosure, the image of the subject is captured, thereby acquiring the video signal. The video signal is compression-coded through both of the intra-frame compression and the inter-frame composition, thereby generating the first coded signal. The video signal is also compression-coded through the intra-frame compression, thereby generating the second coded signal the amount of information on which is less than that of the first coded signal. Both of the first coded signal and the second coded signal are sent to the coaxial cable.

As set forth hereinabove, according to the embodiments of the present disclosure, it is possible to reduce a cost of parts or components.

BRIEF DESCRIPTION OF THE DRAWINGS

FIG. 1 is a block diagram showing a configuration of an existing image transmitting system;

FIG. 7 is a flow chart explaining image transmitting processing in an image transmitting method used in the monitoring camera according to the embodiment of the present disclosure.

DETAILED DESCRIPTION OF THE PREFERRED EMBODIMENT

An embodiment of the present disclosure will be described in detail hereinafter with reference to the accompanying drawings.

[Configuration of Image Transmitting System]

Figure 4:
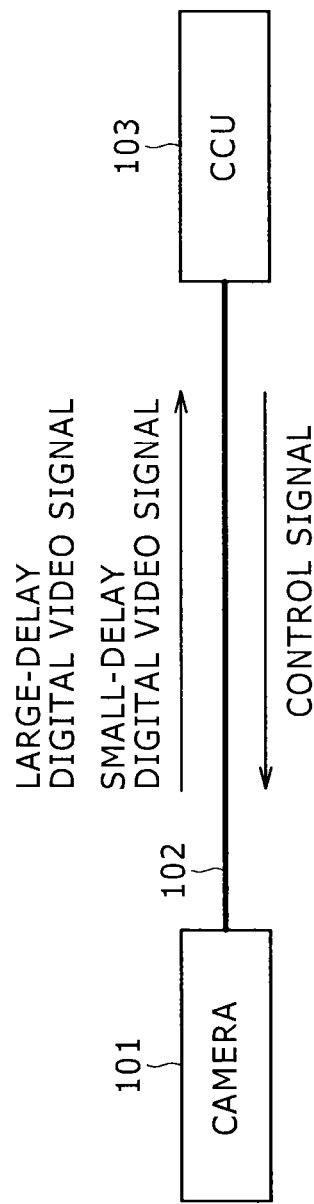
FIG. 4 is a block diagram showing a configuration of an image transmitting system including a monitoring camera as an imaging apparatus according to an embodiment of the present disclosure.

FIG. 4 is a block diagram showing a configuration of an image transmitting system including a monitoring camera as an imaging apparatus according to an embodiment of the present disclosure. The image transmitting system shown in FIG. 4 is a monitoring camera system, and has a monitoring camera 101 (hereinafter referred simply to as "the camera 101") as the imaging apparatus, a coaxial cable 102, and a CCU 103. A signal is transmitted through the coaxial cable 102, and the CCU 103 controls an operation of the camera 101.

In the image transmitting system shown in FIG. 4, the camera 101 generates both of a small-delay digital video signal in which a delay either in a phase of recording or in a phase of reproducing in the CCU 103 is small, and a large-delay digital video signal in which the delay either in the phase of recording or in the phase of reproducing in the CCU 103 is large as a video signal of a moving image captured. The camera 101 transmits both of the small-delay digital video signal and the large-delay digital video signal to the CCU 103 through the coaxial cable 102. The CCU 103 transmits a control signal in accordance with which the operation of the camera 101 is controlled to the camera 101 through the coaxial cable 102. It is noted that both of the small-delay digital video signal and the large-delay digital video signal transmitted to the CCU 103 are supplied to either a recording apparatus or reproducing apparatus (not shown), thereby being either recoded or reproduced (displayed).

Figure 5:
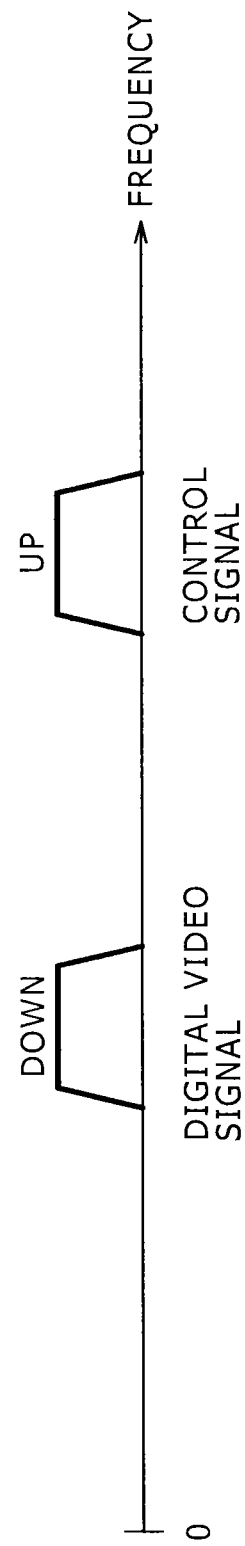
FIG. 5 is a diagram explaining a frequency band of a signal which is transmitted in the image transmitting system shown in FIG. 4.

Since no analog signal is generated in the image transmitting system shown in FIG. 4 in such a manner, as shown in FIG. 5, both of the digital video signals and the control signal are transmitted by utilizing only the band of about 10 MHz to 100 MHz. As a result, it is possible to enhance a utilization efficiency of the frequency band.

[Configuration of Camera]

Figure 6:
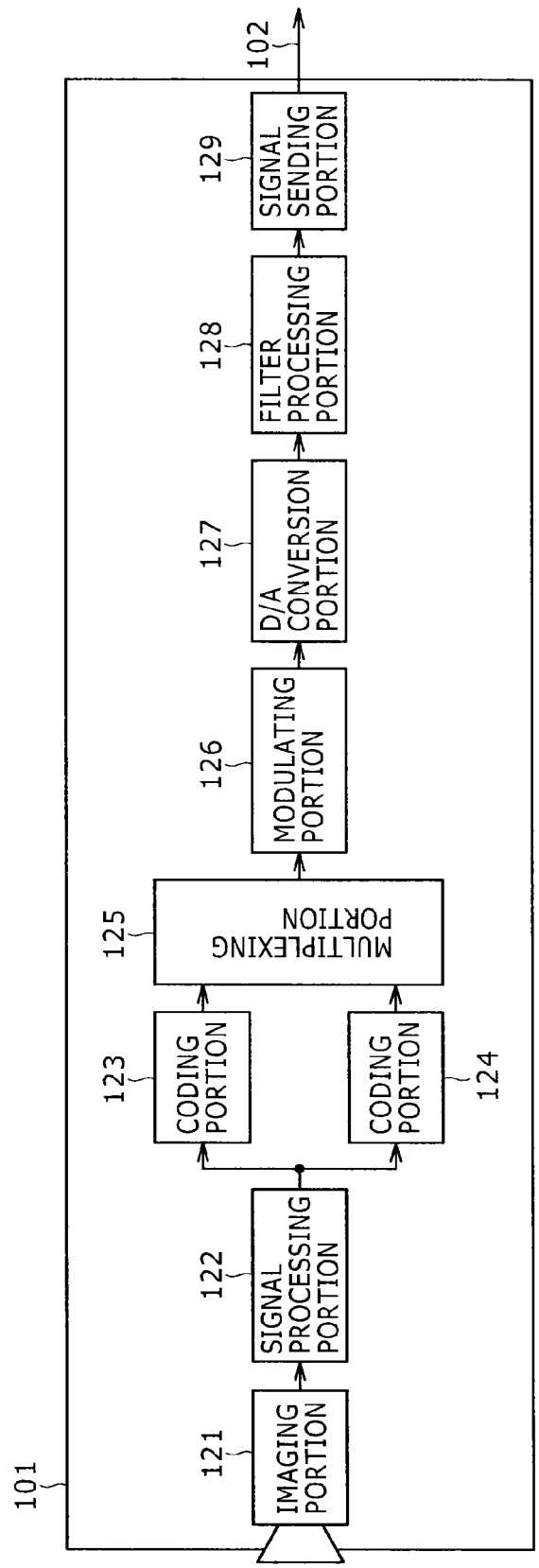
FIG. 6 is a block diagram showing a concrete configuration of the monitoring camera as the imaging apparatus according to the embodiment of the present disclosure.

FIG. 6 is a block diagram showing a concrete configuration of the camera 101 shown in FIG. 4, according to the embodiment of the present disclosure.

The camera 101 shown in FIG. 6 includes an imaging portion 121, a signal processing portion 122, a coding portion 123, a coding portion 124, a multiplexing portion 125, a modulating portion 126, a D/A conversion portion 127, a filter processing portion 128, and a signal sending portion 129.

It is noted that in the camera 101 shown in FIG. 6, a configuration adapted to receive the control signal supplied from the CCU 103 is omitted here in illustration and description thereof for the sake of simplicity.

The imaging portion 121 condenses a light emitted from a subject by using a lens, and makes the light thus condensed incident to an image sensor, for example, composed of a Charge Coupled Device (CCD) image sensor or the like, thereby capturing an image of the subject. The imaging portion 121 photoelectrically converts the light made incident to the image sensor, executes predetermined pieces of processing such as correlation square sampling for noise cleaning, gain control, and Analog to Digital (A/D) conversion, and supplies the resulting video signal to the signal processing portion 122.

The signal processing portion 122 subjects the video signal supplied thereto from the imaging portion 121 to predetermined pieces of signal processing such as defect correction processing, image quality correction processing, and color space conversion processing, and supplies the video signal for which the predetermined pieces of signal processing are executed to each of the coding portion 123 and the coding portion 124.

The coding portion 123 compression-codes the video signal supplied thereto from the signal processing portion 122 through both of intra-frame compression and inter-frame compression, and supplies the resulting coded signal (coded stream) to the multiplexing portion 125. Specifically, for example, the coding portion 123 compression-codes the video signal supplied thereto from the signal processing portion 122 in accordance with an MPEG system, thereby generating a coded stream composed of a Group of Picture (GOP) including an I picture, a P picture, and a B picture. The I picture is data having information for one frame of an image. Also, each of the P picture and the B picture is data having information on a difference between a preceding frame and a subsequent frame.

The coding portion 124 compression-codes the video signal supplied thereto from the signal processing portion 122 through the intra-frame compression, and supplies the resulting coded signal (coded stream) to the multiplexing portion 125. Specifically, for example, the coding portion 124 compression-codes the video signal supplied thereto from the signal processing portion 122 in accordance with the MPEG system, thereby generating a coded stream composed of only the I picture which is obtained by thinning out both of the P picture and the B picture in the GOP described above.

Here, since in the CCU 103, the coded signal generated by the coding portion 124 has only the I picture after both of the P picture and the B picture in the GOP described above have been thinned out, the coded signal concerned is either recorded or reproduced at a low image quality, but with a smaller delay than that in the coded signal generated by the coding portion 123. Since the coded signal generated by the coding portion 123 has the I picture, the P picture, and the B picture, the coded signal concerned is either recorded or reproduced with a large delay, but at a higher image quality than that in the coded signal generated by the coding portion 124.

The multiplexing portion 125 multiplexes the coded signals supplied thereto from the coding portion 123 and the coding portion 124, and supplies the resulting multiplexed signal to the modulating portion 126.

The modulating portion 126 modulates the multiplexed signal supplied thereto from the multiplexing portion 125 in accordance with an OFDM system, and supplies the modulated signal to the D/A conversion portion 127.

The D/A conversion portion 127 subjects the modulated signal obtained through the modulation in the modulating portion 126 to D/A conversion, and supplies the resulting signal to the filter processing portion 128.

The filter processing portion 128 extracts only a component in a predetermined frequency band from the signal supplied thereto from the D/A conversion portion 127, thereby carrying out a band limitation, and supplies the resulting signal to the signal sending portion 129.

The signal sending portion 129 sends the signal supplied thereto from the filter processing portion 128 to the coaxial cable 102.

In the configuration described above, crystal oscillators which are provided in the coding portions 123 and 124, respectively, the D/A conversion portion 127, and the filter processing portion 128 are all analog parts or components.

Figure 2:
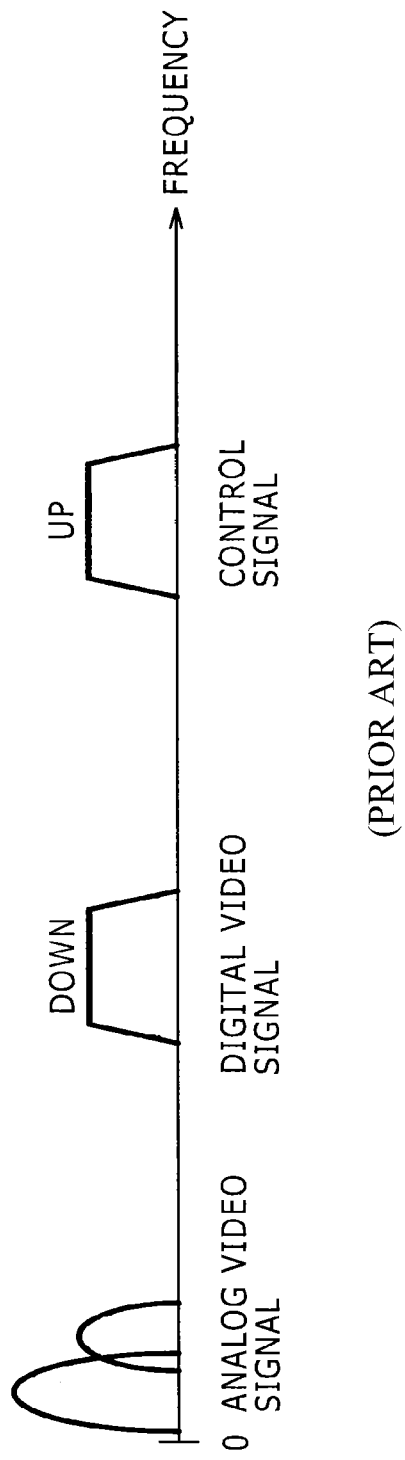
FIG. 2 is a diagram explaining a frequency band of a signal which is transmitted in the existing image transmitting system.
Figure 3:
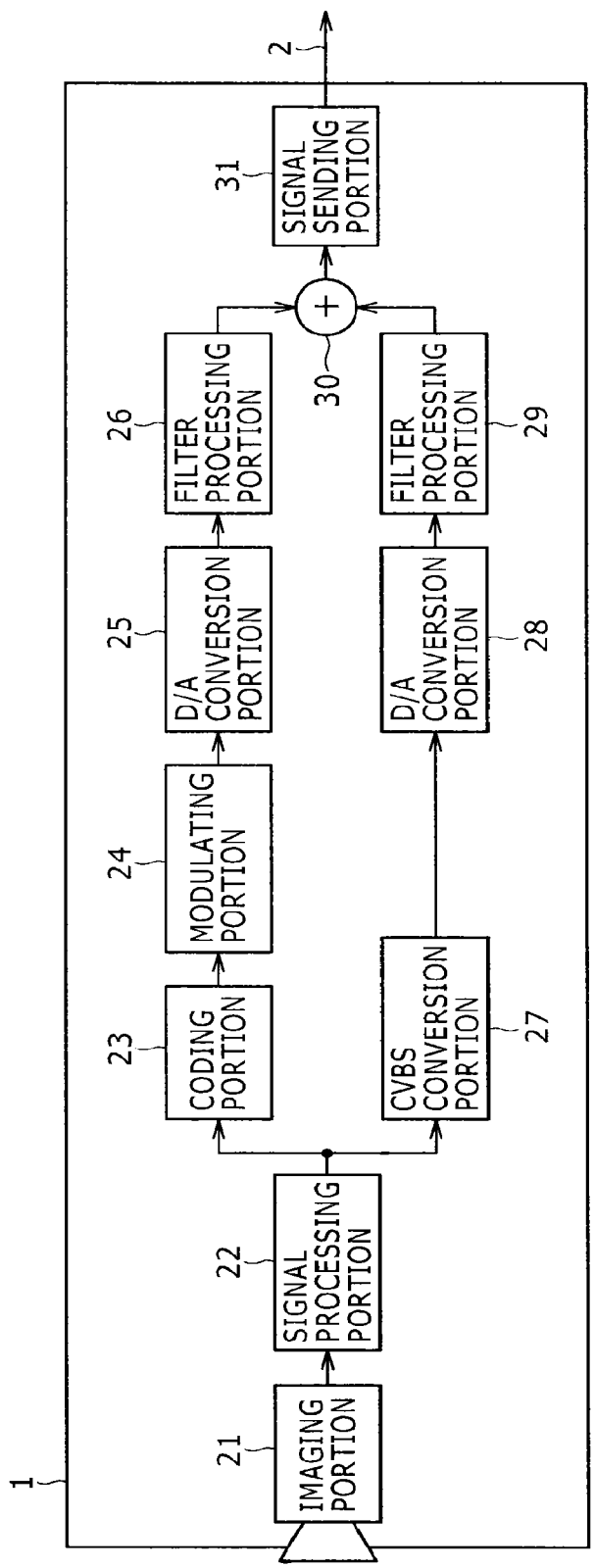
FIG. 3 is a block diagram showing a concrete configuration of an existing monitoring camera shown in FIG. 1.

That is to say, according to the configuration described above, since the use of analog parts or components can be suppressed as compared with the configuration of the camera 1 previously described with reference to FIG. 3, it is possible to reduce the cost of the parts or components. In addition, since the coding portion 124 only carries out the intra-frame compression (the generation of only the I picture), the coding portion 124 can be realized in the form of a digital circuit having about one hundred thousand gates, and thus can be configured on a smaller circuit scale than that of the CVBS conversion portion 27 shown in FIG. 3. As a result, it is possible to reduce the circuit scale of the entire camera 101.

A digital signal has resistance to a transmission line loss relative to an analog signal. Therefore, in the image transmitting system of the embodiment of the present technique, the cable length of the coaxial cable 102 can be made longer than that of the coaxial cable 2 in the existing image transmitting system in which an analog signal is transmitted. Specifically, in the existing image transmitting system in which the analog signal is transmitted, the cable length of the coaxial cable 2 remains within a matter of about 300 m, whereas in the image transmitting system of the embodiment of the present technique, the cable length of the coaxial cable 102 can be made to extend up to about 1,000 m.

[Image Transmitting Processing]

Next, image transmitting processing executed by the camera 101 will be described with reference to a flow chart shown in FIG. 7.

In Step S11, the imaging portion 121 captures an image of a subject to acquire a video signal of the image thus captured, and supplies the video signal to the signal processing portion 122.

In Step S12, the signal processing portion 122 subjects the video signal supplied thereto from the imaging portion 121 to various kinds of pieces of signal processing, and supplies the video signal for which the various kinds of pieces of signal processing have been executed to each of the coding portion 123 and the coding portion 124.

In Step S13, the coding portion 123 compression-codes the video signal supplied thereto from the signal processing portion 122 in accordance with the MPEG system, thereby generating a coded signal having an I picture, P picture, and B picture. The coding portion 123 supplies the coded signal thus generated to the multiplexing portion 125.

In Step S14 whose processing is executed in parallel with the processing in Step S13, the coding portion 124 compression-codes the video signal supplied thereto from the signal processing portion 122 in accordance with the MPEG system, thereby generating a coded signal having only the I picture. The coding portion 124 supplies the coded signal thus generated to the multiplexing portion 125.

In Step S15, the multiplexing portion 125 multiplexes the coded signal supplied thereto from the coding portion 123, and the coded signal supplied thereto from the coding portion 124, and supplies the multiplexed signal thus obtained to the modulating portion 126.

In Step S16, the modulating portion 126 modulates the multiplexed signal supplied thereto from the multiplexing portion 125 in accordance with the OFDM system, and supplies the modulated signal to the D/A conversion portion 127.

In Step S17, the D/A conversion portion 127 subjects the modulated signal obtained through the modulation in the modulating portion 126 to the D/A conversion, and supplies the resulting signal to the filter processing portion 128.

In Step S18, the filter processing portion 128 extracts only a component in a predetermined frequency band from the signal supplied thereto from the D/A conversion portion 127, thereby carrying out the band limitation, and supplies the component in the predetermined frequency band to the signal sending portion 129.

In Step S19, the signal sending portion 129 sends the signal supplied thereto from the filter processing portion 128 to the coaxial cable 102.

According to the processing described above, the camera 101 can transmit both of the small-delay digital video signal having the low-image quality, and the large-delay digital video signal having the high-image quality as the video signal of the moving image captured to the CCU 103 through the coaxial cable 102. Therefore, by applying the present technique to a monitoring camera system, when a watcher chases a suspicious individual, the watcher can control a monitoring camera while he/she visually checks the small-delay digital image, and also can record the high-quality digital image.

It is noted that although in the foregoing, it is supposed that each of the coding portions 123 and 124 carries out the compression coding in accordance with the MPEG system, alternatively, for example, each of the coding portions 123 and 124 may carry out the compression coding in accordance with a VC-1 system. However, in this case as well, of course, the coding portion 124 generates only the coded signal obtained through the intra-frame compression.

A procedure may also be adopted such that the coding portion 123 carries out the compression coding in accordance with the MPEG system, thereby generating the coded signal having the I, P, and B pictures, while the coding portion 124 carries out the intra-frame compression in accordance with a system such as a Motion Joint Photographic Experts Group (JPEG), a Motion JPEG eXtended Range (XR), or JPEG 2000, thereby generating the coded signal.

The coding carried out by the coding portion 123, and the coding carried out by the coding portion 124 may comply with any ones of the systems described above with respect to the coding portion 123 and the coding portion 124.

Note that, in this specification, a system means a set of plural constituent elements (such as apparatuses or modules (parts or components)), and it is no object whether or not all of the constituent elements are provided within the same chassis. Therefore, plural apparatuses which are accommodated in different chassis, and which are connected to one another through a network, and one apparatus in which plural modules are accommodated in one chassis are each a system.

It is noted that the embodiment of the present disclosure is by no means limited to the embodiment described above, and the various kinds of changes can be made without departing from the subject matter of the present disclosure.

For example, in the camera 101 shown in FIG. 6, the imaging portion 121 and the signal processing portion 122, and the portions from the coding portion 123 to the signal sending portion 129 may be configured in the form of different units (or devices) in such a way that the imaging portion 121 and the signal processing portion 122 are configured in the form of a camera unit, and the portions from the coding portion 123 to the signal sending portion 129 are configured in the form of an image transmitting device.

For example, the present disclosure can adopt a configuration of Cloud Computing in which one function is shared among plural apparatuses or devices through a network, and plural apparatuses or devices cooperatively execute one function through the network.

The steps described with reference to the flow chart described above not only can be executed by one apparatus or device, but also can be shared among plural apparatuses or devices to be executed.

When plural pieces of processing are contained in one step, the plural pieces of processing contained in one step not only can be executed by one apparatus or device, but also can be shared among plural apparatuses or devices to be executed.

It is noted that the present disclosure can adopt the following constitutions.

(1) An imaging apparatus including:
an imaging portion capturing an image of a subject, thereby acquiring a video signal;
a first coding portion compression-coding the video signal through intra-frame compression and inter-frame compression, thereby generating a first coded signal;
a second coding portion compression-coding the video signal through the intra-frame compression, thereby generating a second coded signal an amount of information on which is less than that of the first coded signal; and
a signal sending portion sending the first coded signal and the second coded signal to a coaxial cable.

(2) The imaging apparatus described in the paragraph (1),
in which the first coding portion compression-codes the video signal in accordance with a Moving Picture Experts Group system, thereby generating the first coded signal having an I picture, a P picture, and a B picture, and
the second coding portion compression-codes the video signal in accordance with the Moving Picture Experts Group system, thereby generating the second coded signal having only the I picture obtained through thinning-out of the P picture and the B picture in the first coded signal.

(3) The imaging apparatus described in the paragraph (1) or (2), further including
a multiplexing portion multiplexing the first coded signal and the second coded signal,
in which the signal sending portion sends a multiplexed signal obtained from the multiplexing portion to the coaxial cable.

(4) The imaging apparatus described in the paragraph (3), further including
a modulating portion modulating the multiplexed signal obtained from the multiplexing portion in accordance with an Orthogonal Frequency Division Multiplexing system,
in which the signal sending portion sends a modulated signal obtained from the modulating portion to the coaxial cable.

(5) An image transmitting method used in an imaging apparatus having
    an imaging portion capturing an image of a subject, thereby acquiring a video signal,
    a first coding portion compression-coding the video signal through intra-frame compression and inter-frame compression, thereby generating a first coded signal,
    a second coding portion compression-coding the video signal through the intra-frame compression, thereby generating a second coded signal an amount of information on which is less than that of the first coded signal, and a signal sending portion sending the first coded signal and the second coded signal to a coaxial cable, the image transmitting method, executed by the imaging apparatus, including:

capturing the image of the subject, thereby acquiring the video signal;

compression-coding the video signal through the intra-frame compression and inter-frame compression, thereby generating the first coded signal;

compression-coding the video signal through the intra-frame compression, thereby generating the second coded signal the amount of information on which is less than that of the first coded signal; and sending the first coded signal and the second coded signal to the coaxial cable.

The present disclosure contains subject matter related to that disclosed in Japanese Priority Patent Application JP 2012-049085 filed in the Japan Patent Office on Mar. 6, 2012, the entire content of which is hereby incorporated by reference.

What is claimed is:

1. An imaging apparatus comprising:
   an imaging portion configured to capture an image of a subject to acquire a video signal;
   a first coding portion configured to perform compression-coding of the video signal through intra-frame compression and inter-frame compression to generate a first coded signal;
   a second coding portion configured to perform compression-coding of the video signal through the intra-frame compression to generate a second coded signal having an amount of information less than that of the first coded signal, the second coded signal being recorded or reproduced with a delay smaller than that of the first coded signal; and
   a signal sending portion configured to send the first coded signal and the second coded signal to a coaxial cable.

2. The imaging apparatus according to claim 1,
   wherein the first coding portion is configured to perform compression coding of the video signal in accordance with a Moving Picture Experts Group system, thereby generating the first coded signal having an I picture, a P picture, and a B picture, and
   the second coding portion is configured to perform compression-coding of the video signal in accordance with the Moving Picture Experts Group system, thereby generating the second coded signal having only the I picture obtained through thinning-out of the P picture and the B picture in the first coded signal.

3. The imaging apparatus according to claim 1, further comprising a multiplexing portion configured to multiplex the first coded signal and the second coded signal,
   wherein the signal sending portion is configured to send a multiplexed signal obtained from the multiplexing portion to the coaxial cable.

4. The imaging apparatus according to claim 3, further comprising a modulating portion configured to modulate the multiplexed signal obtained from the multiplexing portion in accordance with an Orthogonal Frequency Division Multiplexing system,
   wherein the signal sending portion is configured to send a modulated signal obtained from the modulating portion to the coaxial cable.

5. The imaging apparatus according to claim 1, wherein the second coded signal is adapted to be reproduced at an image quality lower than that of the first coded signal.

6. The imaging apparatus according to claim 1, wherein the compression-coding of the video signal to generate the first coded signal is performed in parallel with the compression-coding of the video signal to generate the second coded signal.

7. The imaging apparatus according to claim 1, wherein the second coding portion is configured to perform the compression-coding in accordance with a VC-1 system.

8. An image transmitting method used in an imaging apparatus comprising:
   acquiring a video signal by capturing an image of a subject;
   generating, by compression-coding the video signal through intra-frame compression and inter-frame compression, a first coded signal;
   generating, by compression-coding the video signal through the intra-frame compression a second coded signal having an amount of information less than that of the first coded signal, the second coded signal being reproduced or recorded with a delay smaller than that of the first coded signal, and
   sending the first coded signal and the second coded signal to a coaxial cable.

* * * * *